Figure 1:
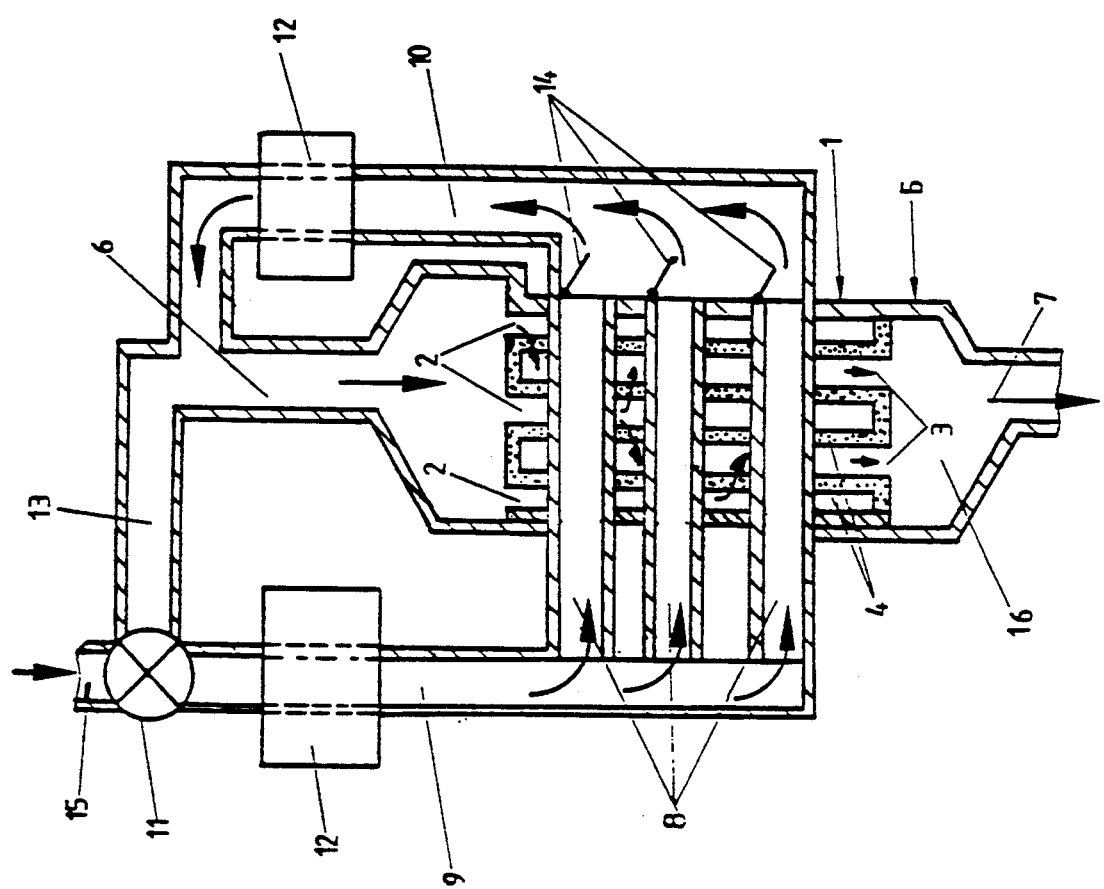

United States Patent [19]

Zirkel

[11] Patent Number: 5,335,492
[45] Date of Patent: Aug. 9, 1994

[54] EXHAUST GAS FILTER AND/OR A CATALYTIC CONVERTER

[75] Inventor: Herbert Zirkel, Aalen-Wasseralfingen, Fed. Rep. of Germany

[73] Assignee: Schwaebische Huettenwerke GmbH, Wasseralfingen, Fed. Rep. of Germany

[21] Appl. No.: 851,617

[22] Filed: Mar. 16, 1992

[30] Foreign Application Priority Data

Mar. 21, 1991 [DE] Fed. Rep. of Germany ....... 4109227

[51] Int. Cl.⁵ ............................................. F01N 3/02
[52] U.S. Cl. ......................................... 60/298; 55/267; 55/DIG. 30; 60/297; 60/300; 60/311; 422/175
[58] Field of Search ................ 60/297, 298, 274, 300, 60/311; 422/173, 175; 55/267, 268, 269, DIG. 30

[56] References Cited

U.S. PATENT DOCUMENTS

| | | |
|---|---|---|
| 2,267,918 | 12/1941 | Hildabolt . |
| 3,087,233 | 4/1963 | Turnbull . |
| 3,161,478 | 12/1964 | Chessin . |
| 3,295,919 | 1/1967 | Henderson .......................... 60/298 |
| 3,306,353 | 2/1967 | Burne . |
| 3,810,732 | 5/1974 | Koch . |
| 3,904,551 | 9/1975 | Lundsager et al. . |
| 3,956,192 | 5/1976 | Nicolai . |
| 4,064,914 | 12/1977 | Grant . |
| 4,301,012 | 11/1981 | Puckett . |
| 4,329,162 | 5/1982 | Pitcher, Jr. . |
| 4,515,758 | 5/1985 | Domesle et al. . |
| 4,650,414 | 3/1987 | Grenfell .............................. 422/173 |
| 4,652,286 | 3/1987 | Kusuda et al. . |
| 4,662,915 | 5/1987 | Shirai et al. . |
| 4,687,579 | 8/1987 | Bergman . |
| 4,725,411 | 2/1988 | Cornelison . |
| 4,732,593 | 3/1988 | Kondo et al. . |
| 4,758,272 | 7/1988 | Pierotti et al. . |
| 4,760,047 | 7/1988 | Jeschke et al. . |
| 4,889,630 | 12/1989 | Reinhardt et al. . |
| 4,960,449 | 10/1990 | Yonushonis . |
| 4,971,769 | 11/1990 | Haerle . |
| 4,981,172 | 1/1991 | Haerle . |
| 4,983,193 | 1/1991 | Tani et al. . |
| 5,009,857 | 4/1991 | Haerle . |
| 5,059,326 | 10/1991 | Haerle . |
| 5,158,753 | 10/1992 | Take ................................... 422/175 |

FOREIGN PATENT DOCUMENTS

| | | |
|---|---|---|
| 42301 | 12/1981 | European Pat. Off. . |
| 1542215 | 1/1973 | Fed. Rep. of Germany ...... 422/173 |
| 3901609 | 7/1990 | Fed. Rep. of Germany . |
| 3908581 | 9/1990 | Fed. Rep. of Germany . |
| 3937809 | 5/1991 | Fed. Rep. of Germany . |
| 1453653 | 9/1966 | France . |
| 2462188 | 2/1981 | France . |
| 54-128842 | 10/1979 | Japan . |
| 79025 | 5/1984 | Japan ..................................... 60/298 |
| 61-256113 | 11/1986 | Japan . |
| 61-287451 | 12/1986 | Japan . |
| 62-225221 | 10/1987 | Japan . |
| 257710 | 10/1989 | Japan ..................................... 60/297 |

*Primary Examiner*—Douglas Hart
*Attorney, Agent, or Firm*—Welsh & Katz, Ltd.

[57] ABSTRACT

An exhaust gas filter and/or a catalytic converter for the removal of harmful constituents from the exhaust gas of an internal combustion engine is provided with a feed duct (6) to a filter or converter unit (1) made from metal materials, which form a unit penetrated by cavities, through which the exhaust gas is conveyed, from compression-moulded wires or fibers as a tangled mass, braiding, knitted fabric or woven cloth or in powder, granular or chip form, and with a delivery duct (7) for the exhaust gas purified by the filter or converter unit (1). The filter or converter unit (1) is also constructed as a heat exchanger unit for the exhaust gas to be cleaned.

10 Claims, 2 Drawing Sheets

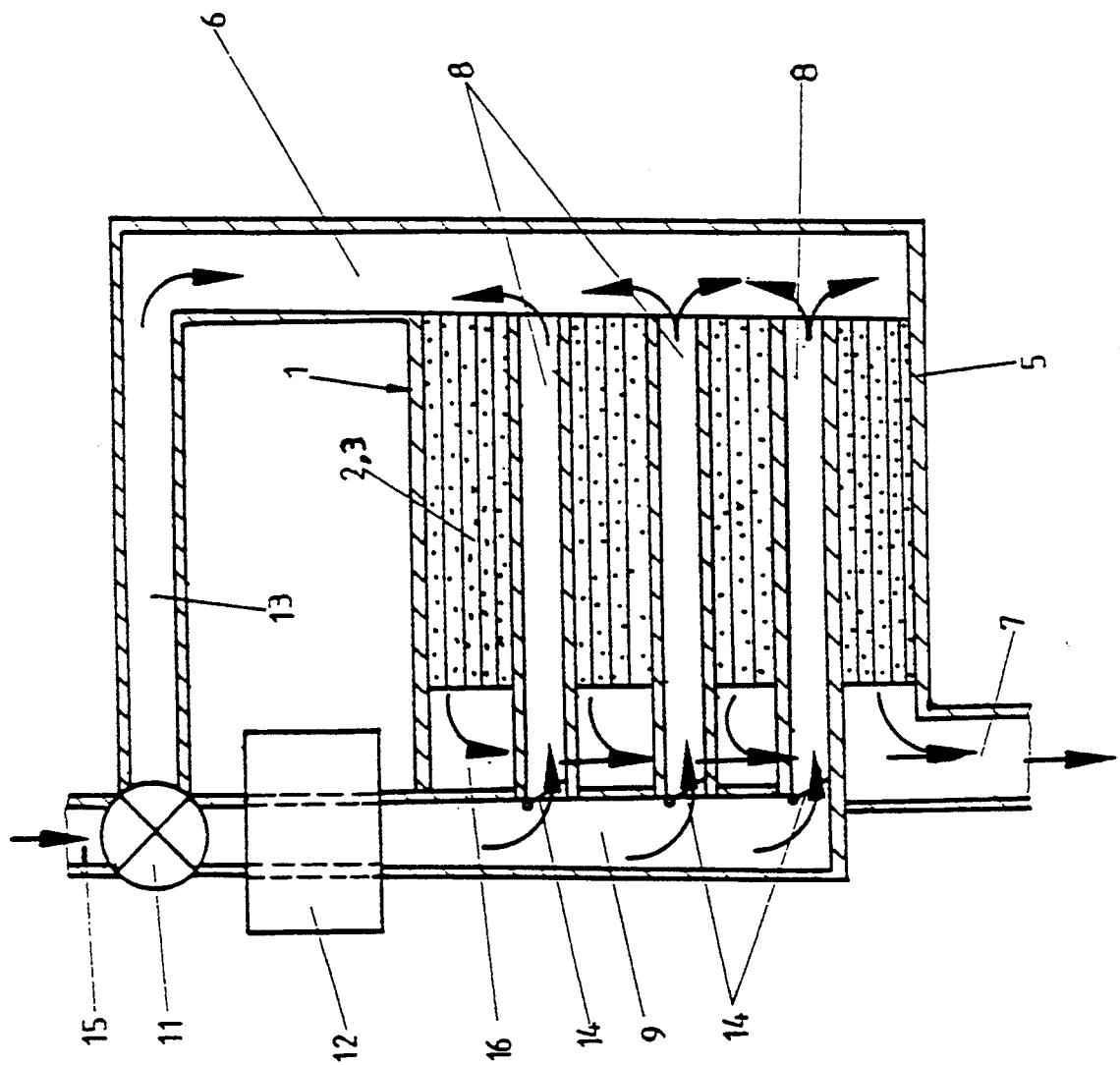

EXHAUST GAS FILTER AND/OR A CATALYTIC CONVERTER

The invention relates to an exhaust gas filter and/or a catalytic converter for the removal of harmful constituents from the exhaust gas of an internal combustion engine, having a feed duct to a filter or converter unit made from metal materials, which form a unit penetrated by cavities, through which the exhaust gas is conveyed, from compression-moulded wires or fibres as a tangled mass, braiding, knitted fabric or woven cloth or in powder, granular or chip form, and having a delivery duct for the exhaust gas purified by the filter or converter unit.

Filter or catalytic converters of this type are known from German Offenlegungsschrift 38 18 281, for example, in which the filter unit consists of a plurality of compression-moulded sintered parts made of steel and having high temperature stability, to which materials having a catalytic action are added to achieve catalytic actions. The filter unit is constructed so that a plurality of inlet and outlet ducts is formed, the exhaust gas to be cleaned having to pass through the walls lying therebetween. The desired exhaust gas purification, in particular the removal of soot and substances similar to soot, is achieved by this.

From German Offenlegungsschrift 39 01 609 there is also known an exhaust gas filter formed from sinter material, which is manufactured from a strip with spacers and is wound in a spiral. Inlet and outlet ducts with reaction walls lying therebetween are also formed by partitions.

In German Offenlegungsschrift 39 08 581 there is described a method for the manufacture of a filter or converter unit which is constructed from multi-layer woven cloth or knitted fabric which are sintered together, powdery, granular or chip-like particles being sintered onto the individual layers and/or their constituents.

Such a woven cloth, braiding, or knitted fabric can also be produced by welding or soldering or also in conjunction with a sintering process to form a filter or converter unit.

During the operation of a filter or catalytic converter of the aforementioned type, it is desirable that the temperature of the unit is as high and as constant as possible, because this promotes and accelerates the progress of the chemical process striven for, such as, for example, the burning off of the soot in diesel engines and the conversion of other exhaust gas constituents into less harmful constituents. However at the same time excessively high temperatures should be avoided so as not to damage any constituents having a catalytic action.

However a big problem lies in the fact that the operating conditions of the exhaust gas generator, i.e. the internal combustion engine, for example, can fluctuate considerably depending on the performance of the driven vehicle, as a result of which the exhaust gas has large temperature variations. The range of variation may be from 50° C. (thrust operation of an engine for a commercial vehicle) to 8°–900° C. (full load operation of an engine for a private car).

It should also be noted that the temperature of the filter or of the catalytic converter depends on where it is located. Thus, for example, clearly different conditions prevail if the filter or the catalytic converter is located in the flow of exhaust gas directly behind the engine or further away therefrom, e.g. under the floor of the vehicle in the vicinity of or connected to the exhaust silencer.

Two methods of heating the filter or the catalytic converter are known for achieving at least a certain equalisation of the temperature of the exhaust gas supplied to the filter or catalytic converter or an increase in temperature in the starting or thrust operation and thus more rapid efficiency. Firstly the flow of exhaust gas heats the filter or converter unit as it flows through it, an attempt being made to achieve rapid heating by giving the filter or converter unit a suitable design. Secondly additional heating appliances, such as, for example, burners, glow plugs, and the like are provided, which are connected either permanently or only when required.

The first-mentioned method has previously proved to be inadequate and the last-mentioned method requires a considerable number of additional mechanical, electrical and other components.

An attempt has also already been made to reduce the ignition point for the rust particles to be burnt by additives to the diesel oil in filters for the exhaust gases of diesel engines. However this inevitably produces problems, because the additives either also have to be filtered out or enter into the atmosphere as harmful substances.

Therefore the object of the present invention is to improve the efficiency of a filter or catalytic converter, and in particular the temperature conditions for it.

This object is achieved according to the invention in that the filter or converter unit is also constructed as a heat exchanger unit for the exhaust gas to be purified.

A clearly better utilization of the heat contained in the flow of exhaust gas is advantageously achieved, and moreover without additional installations or refinements. This is attributed to the fact that the inventor has recognised that the materials mentioned at the beginning are also very suitable as heat exchangers. They have a large surface for thermal absorption and for heat emission, and moreover especially because of their metal basic structure and the bond between the metal constituents. In this way there is largely achieved a thermal conductivity which is used for a heat exchange of the hot flow of exhaust gas flowing into the filter or converter unit.

One of the main advantages of the exhaust gas filter or catalytic converter specified by the invention lies in that with a cold start or under highly cooling operating conditions the necessary operating temperature of the filter or catalytic converter can be attained very quickly or a reduction of said temperature during operation, e.g. in thrust operation, can be avoided and the required operating temperature can be appropriately maintained.

The filter or converter unit may also be constructed as a heat exchanger unit in a variety of ways. It may simply be provided that the filter or converter unit is penetrated by heat exchanger pipes or ducts through which the exhaust gas flows and into which the exhaust gas can be introduced before it enters the actual filter or converter unit.

By this refinement during a cold start and/or with an undercooled operating state the exhaust gases are first of all conveyed through the heat exchanger pipes or ducts before the purification of the exhaust gas occurs. In this way a rapid heating of the unit and thus more rapid efficiency occurs.

In this case it is advantageous if it is provided that in the feed duct there is disposed a regulating or control unit, from which a branch duct leads to the heat exchanger pipes or ducts and a direct line leads to the filter or converter unit.

The flow of exhaust gas can be appropriately controlled or regulated by the regulating or control unit in dependence on the operating state and the prevailing temperature. Thus, for example, it is possible to operate the filter or converter unit directly in the customary way, for the stream of exhaust gas to have been previously diverted and passed through the heat exchanger pipes or ducts or even to have a mixed operation.

A further advantage of the exhaust gas filter or catalytic converter specified by the invention lies in that if required overheating can be avoided by controlling the flow of exhaust gas in an appropriate manner even in overload operation.

After the stream of exhaust gas passes through the heat exchanger pipes or ducts the exhaust gas may again be returned into the feed duct or into the direct line leading to the filter or converter unit.

In an advantageous refinement of the invention it may be provided that the heat exchanger pipes or ducts are provided with shut-off valves which can be operated individually and/or jointly.

An even better control of the temperature may be achieved by shut-off valves, as heat exchanger pipes or ducts can be completely or partly shut off or connected in dependence on the prevailing temperature.

The filter or converter unit can be traversed by the heat exchanger pipes or ducts at right angles to or against the direction of flow of the exhaust gas directed through the filter or converter unit.

A counter-flow direction is generally preferred, as the best heat transmission or heat exchange is achieved thereby.

A plurality of heat exchanger pipes or ducts which are disposed next to one another and on top of one another is generally provided in dependence on the size of the filter or converter unit and the diameter of the heat exchanger pipes or ducts.

The heat exchanger pipes or ducts may be directly formed in the filter or converter unit, in which case it just has to be ensured that imperviousness to exhaust gas is guaranteed, or separate pipes or ducts, which are then securely connected to the unit, are guided through the filter or converter unit.

A very advantageous and not obvious refinement of the invention may lie in that in the lines leading to and from the heat exchanger pipes or ducts extending through the filter or converter unit there is disposed one or several heat accumulators.

Even greater efficiency is achieved in conjunction with an external heat accumulator. In this case if the stream of exhaust gas itself is used to heat or store the heat in the heat accumulator, the additional expenditure for the heat accumulator is correspondingly lower. Known designs, which are constructed on a slat base, for example, may be used as heat accumulators. When the exhaust gas is flowing, the heat accumulator can absorb heat from its heat and then when the exhaust gas is cool, e.g. with the cold start of the engine and in thrust operation, it can yield this heat again to the cooled stream of exhaust gas in a correspondingly equalising manner.

In this case the heat accumulator may be disposed at any point in the feed or delivery lines.

It is advantageous if a heat sensor, by which the position of the regulating or control unit can be adjusted in dependence on the temperature, is disposed in the feed duct in front of the regulating or control unit.

Two exemplified embodiments of the invention are described in principle below by means of the drawings.

FIG. 1 shows an exhaust gas filter or a catalytic converter, having heat exchanger pipes in the cross-flow direction, FIG. 2 shows an exhaust gas filter or a catalytic converter, having heat exchanger pipes in the counter-flow direction.

The exhaust gas filter shown in FIG. 1 has a filter unit 1. The filter unit 1 may be of a known design, as cited in the patent specifications mentioned at the beginning, for example. In FIGS. 1 and 2 there is shown a refinement of a filter unit 1 as described in German Offenlegungsschrift 38 18 281, for example, in which several inlet ducts 2 and outlet ducts 3 are provided, which are separated from one another by filter walls 4.

The filter unit 1 is located in a housing 5, into which a feed duct 6 opens and from which a delivery duct 7 leads on the side of a collection chamber 16 lying opposite the feed duct 6.

Several heat exchanger pipes 8 disposed next to one another or above one another penetrate the filter unit 1. In the exemplified embodiment only three heat exchanger pipes 8 are shown on an enlarged scale for reasons of clarity. On the inlet side the heat exchanger pipes 8 branch from a branch duct 9 and on the outlet side they are combined in a collecting pipe 10, which is returned to the feed duct 6. In the feed duct 6 there is located a regulating or control unit 11. A heat accumulator 12 is shown in principle in the branch duct 9 and the collecting line 10. When they are not in use the stream of exhaust gas can also be guided around the two heat accumulators 12. Of course if need be it is not necessary to provide two heat accumulators 12. If required one heat accumulator is sufficient, either in the branch duct 9 or in the collecting line 10.

The exhaust gas filter or catalytic converter functions as follows:

With a cold start or in an undercooled operating state the exhaust gas flowing in the direction of the arrow into the regulating or control unit 11 is introduced via branch duct 9 into the heat exchanger pipes 8, from which it heats the filter unit 1 by heat emission after flowing through said unit. Via collecting pipe 10 and if appropriate after passing through the heat accumulator 12, the exhaust gas enters into the feed duct 6, from which it flows in the direction of the arrow into the inlet ducts 2 and as it passes through the filter walls 4 it is appropriately cleaned and then flows away via delivery duct 7.

When the desired temperature has been reached the regulating or control unit 11 switches over, completely or partly shuts off the branch duct 9 and conveys the exhaust gas via a direct line 13 into the feed duct 6. In this way a purification of the exhaust gas is performed in the conventional way during its passage through the filter unit 1. As long as no shut-off valves are provided, exhaust gas also flows for a short time into the collection pipe 10 and from there in the opposite direction into the heat exchanger pipes 8, but as there is no escape route pressure very quickly builds up, but this does not result in any impairment of the flow of exhaust gas through the filter unit 1.

If necessary shut-off valves 14 can also be provided on the inlet or outlet side in the heat exchanger pipes 8, and by their use a combined operation is possible. Thus, for example, exhaust gas introduced into the branch duct 9 can only flow via one part of the heat exchanger pipes 8 when another part is blocked by shut-off valves 14.

A heat sensor 15 may also be provided in the inlet in front of the regulating or control unit to regulate the flow of exhaust gas. A hi-metal spring or a "memory" material, for example, may be used as a heat sensor, and its position, which depends on the temperature, is used to relate the regulating or control unit 11.

Another refinement of an exhaust gas filter is shown in FIG. 2. The filter unit 1 can be constructed in the same way as the filter unit in FIG. 1, which has inlet ducts 2 and outlet ducts 3. However for simplification the filter unit 1 is only represented as a "block".

However the filter unit 1 may naturally be of a different design. For this purpose reference is made to the known filter and converter bodies mentioned at the beginning.

The essential difference between this refinement and the form shown in FIG. 1 lies in that the heat exchanger pipes 8 are guided through the filter unit 1 so that in said pipes there ensues a counter flow to the flow which itself conveys the exhaust gas to be purified when flowing through the filter unit 1. For this purpose the heat exchanger pipes 8 connected with the branch duct 9 are guided through the collection chamber 16. The delivery duct 7 leads from the collection chamber 16.

As the design of the exhaust gas filter is basically the same as the exhaust gas filter described with reference to FIG. 1, the same reference numbers are also used for the same parts here. The exhaust gas filter shown in FIG. 2 operates as follows:

In cold operation the stream of exhaust gas is introduced by the regulating or control unit 11 into the branch duct 9, and it can also be guided through a heat accumulator 12 for further heating. After passing through the heat exchanger pipes 8, when the exhaust gas yields its heat to the filter unit 1, on the inlet side it travels to the inlet ducts at the filter unit 1 and is passed through the filter unit for the purpose of cleaning the exhaust gas as shown by the direction of the arrow in the direction opposite to the stream of exhaust gas conveyed through the heat exchanger pipes. On the inlet side of the heat exchanger pipes 8 the purified exhaust gas leaves the filter unit 1 and enters into the collection chamber 16, from where it travels to the delivery duct by flowing around the collection chamber 16 (see arrows in the collection chamber 16). In this case it should just be ensured that the collection chamber 16 and the heat exchanger pipes 8 are impervious to exhaust gas.

In normal operation the regulating or control unit 11 conveys the stream of exhaust gas via the direct line 13 directly to the inlet side of the filter unit 1. In this case the feed duct 6 is identical with the direct line 13. Moreover the exhaust gas can also flow into the heat exchanger pipes 8 in the direction opposite to the direction described above as long as no shut-off valves are provided, but even in this case a build-up of pressure which does not then interfere with the operation very quickly ensues.

In addition at the outlet side or—as shown—at the inlet side shut-off valves 14, which may effect a partial or complete obstruction, may be provided in the heat exchanger pipes 8.

I claim:

1. A filter for the removal of harmful constituents from the exhaust gas of an internal combustion engine, having a feed duct to a filter unit made from metal materials, which form a unit penetrated by cavities through which the exhaust gas is conveyed, said filter unit having compression-moulded fibers in a form consisting of at least one of a tangled mass, braided fabric, knitted fabric, woven cloth, powder, granules or chip, and having a delivery duct for the exhaust gas emitted by said filter unit, said filter unit also functioning as a heat exchanger unit for said exhaust gas, and said filter unit is penetrated by heat exchanger pipes through which the exhaust gas flows and into which the exhaust gas can be introduced before its entry into the actual filter unit, said heat exchanger pipes being provided with shut-off valves which can be operated individually or jointly.

2. An exhaust gas filter according to claim 1 characterized in that in said feed duct there is disposed a control unit, from which a branch duct leads to the heat exchanger pipes and a direct line leads to the filter unit.

3. A filter according to claim 2, characterized in that said heat exchanger pipes open into said feed duct or said direct line after passage through said filter unit.

4. An exhaust gas according to claim 1, characterized in that said heat exchanger pipes pass through said filter unit at right angles to the direction of flow of the exhaust gas.

5. An exhaust gas filter according to claim 1, characterized in that said heat exchanger pipes pass through said filter unit in the opposite direction to the direction of flow of the exhaust gas.

6. An exhaust gas filter according to claim 1, characterized in that a plurality of heat exchanger pipes disposed adjacent one another pass through said filter unit (1).

7. An exhaust gas filter according to claim 1, characterized in that said heat exchanger pipes are directly formed in said filter unit so that they are impervious to exhaust gas.

8. A filter according to claim 1, characterized in that said heat exchanger pipes pass through said filter unit as separate pipes and are connected securely thereto.

9. A filter according to claim 1, characterized in that at least one heat accumulator is disposed in said feed duct or said delivery duct.

10. A filter according to claim 2, characterized in that in said feed duct in front of said control unit there is disposed a heat sensor, by which the direction of the exhaust gas flow can be adjusted by said control unit in dependence on the temperature.

* * * * *